(12) United States Patent
Bento et al.

(10) Patent No.: US 9,395,020 B2
(45) Date of Patent: Jul. 19, 2016

(54) TWO SPOOL ENERGY SAVER VALVE

(75) Inventors: José Carlos Bento, São Paulo (BR);
Robert N. Winsand, Chicago, IL (US);
David W. Haselden, Jr., Canon, GA (US)

(73) Assignees: Ross Operating Valve Company, Troy, MI (US); Ross South America LTDA., Sao Paulo (BR)

( * ) Notice: Subject to any disclaimer, the term of this patent is extended or adjusted under 35 U.S.C. 154(b) by 694 days.

(21) Appl. No.: 13/702,751

(22) PCT Filed: Jun. 14, 2010

(86) PCT No.: PCT/US2010/038474
§ 371 (c)(1),
(2), (4) Date: Dec. 7, 2012

(87) PCT Pub. No.: WO2011/155952
PCT Pub. Date: Dec. 15, 2011

(65) Prior Publication Data
US 2013/0087729 A1 Apr. 11, 2013

Related U.S. Application Data

(60) Provisional application No. 61/352,996, filed on Jun. 9, 2010.

(51) Int. Cl.
*F16K 11/16* (2006.01)
*F16K 39/04* (2006.01)
(Continued)

(52) U.S. Cl.
CPC ............. *F16K 39/04* (2013.01); *F15B 13/0402* (2013.01); *F16K 11/07* (2013.01); *F16K 11/0708* (2013.01); *F16K 11/0712* (2013.01); *F16K 31/0613* (2013.01)

(58) Field of Classification Search
CPC ................. F15B 2211/555; F15B 2211/8609; F16K 11/07; F16K 11/0712; F16K 11/0708; F16K 11/161; F16K 31/0613; F16K 39/04
See application file for complete search history.

(56) References Cited

U.S. PATENT DOCUMENTS 3,269,416 A 8/1966 Adams
4,254,799 A 3/1981 Blatt
(Continued)

FOREIGN PATENT DOCUMENTS

EP 1939461 7/2008
JP 41-11391 6/1941
(Continued)

OTHER PUBLICATIONS

International Search Report and Written Opinion for PCT Application No. PCT/US2010/038474 mailed on Mar. 31, 2011.
(Continued)

*Primary Examiner* — F. Daniel Lopez
(74) *Attorney, Agent, or Firm* — Carlson, Gaskey & Olds, P.C.

(57) ABSTRACT

An energy saver valve includes a first spool (12) and a second spool (18) slidably received in a passage (24) of a housing (8). The first spool and the second spool are separate components. The energy saver valve also includes a first outlet port (40), a second outlet port (42), and a resilient member (34) located in a resilient member chamber (36) that biases the second spool towards the first spool. Fluid exits the first outlet port at a first pressure when the energy saver valve is in an initial position, and another passage (58) provides fluid communication between the fluid in the resilient member chamber and the first outlet port. The fluid exits the second outlet port at a second pressure when the energy saver valve is in an actuated position. The first pressure is less than the second pressure.

14 Claims, 3 Drawing Sheets

(51) Int. Cl.
*F15B 13/04* (2006.01)
*F16K 11/07* (2006.01)
*F16K 31/06* (2006.01)

(56) References Cited

U.S. PATENT DOCUMENTS

| | | | |
|---|---|---|---|
| 4,924,902 A | | 5/1990 | Lewis et al. |
| 6,109,291 A | * | 8/2000 | Yoshimura .................... 137/269 |
| 2009/0224192 A1 | | 9/2009 | Oikawa et al. |

FOREIGN PATENT DOCUMENTS

| | | |
|---|---|---|
| JP | 54-57278 | 4/1979 |
| JP | 03-103685 | 4/1991 |
| JP | 10-132105 | 5/1998 |
| JP | 2011-163466 | 8/2011 |

OTHER PUBLICATIONS

International Preliminary Report on Patentability for PCT Application No. PCT/US2010/038474 mailed on Feb. 7, 2012.

* cited by examiner

TWO SPOOL ENERGY SAVER VALVE

This application is a United States National Phase of PCT Application No. PCT/US2010/038474 filed on Jun. 14, 2010, which claims priority to U.S. Provisional Application No. 61/352,996 filed on Jun. 9, 2010.

BACKGROUND OF THE INVENTION

The present invention relates generally to an energy saver valve, and more specifically to a two spool energy saver valve.

Energy saver valves include a resilient member to return a spool to an initial position after actuation.

SUMMARY OF THE INVENTION

An energy saver valve includes a first spool and a second spool slidably received in a passage of a housing. The first spool and the second spool are separate components. The energy saver valve also includes a first outlet port, a second outlet port, and a resilient member located in a resilient member chamber that biases the second spool towards the first spool. Fluid exits the first outlet port at a first pressure when the energy saver valve is in an initial position, and another passage provides fluid communication between the fluid in the resilient member chamber and the first outlet port. The fluid exits the second outlet port at a second pressure when the energy saver valve is in an actuated position. The first pressure is less than the second pressure.

In another exemplary example, an energy saver valve includes a first spool and a second spool slidably received in a passage of a housing. The first spool and the second spool are separate components. The energy saver valve also includes a first outlet port, a second outlet port, and a resilient member located in a resilient member chamber that biases the second spool towards the first spool. Fluid exits the first outlet port at a first pressure when the energy saver valve is in an initial position, and another passage provides fluid communication between the fluid in the resilient member chamber and the first outlet port. The fluid exits the second outlet port at a second pressure when the energy saver valve is in an actuated position. The first pressure is less than the second pressure. A cylinder includes a piston that defines a separate first compartment and a second compartment. The first outlet port is in fluid communication with the first compartment, and the second outlet port is in fluid communication with the second compartment. When the energy saver valve is in the initial position, the solenoid valve is not energized, and the resilient member is in an extended state to bias the second spool towards the first spool. The fluid enters an inlet port and flows through the first outlet port to retract a piston. The fluid is exhausted through the second outlet port and a second exhaust port. When the energy saver valve is in an actuated position, the solenoid valve is energized to bias the first spool and the second spool towards the resilient member to compress the resilient member. The fluid enters the inlet port and flows through a second outlet port to extend the piston. The fluid is exhausted through the first outlet port and a first exhaust port.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompanies the detailed description can be briefly described as follows.

DETAILED DESCRIPTION OF PREFERRED EMBODIMENTS

Figure 1:
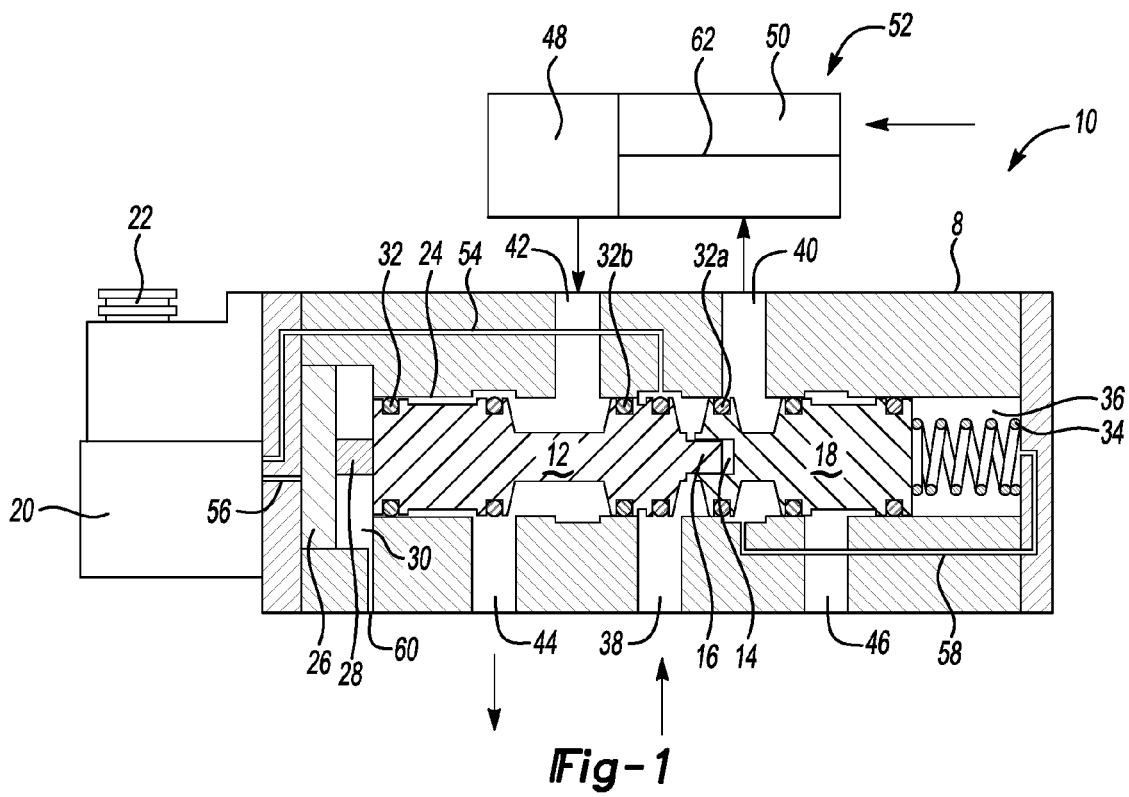
FIG. 1 illustrates an energy saver valve in an initial position.
Figure 2:
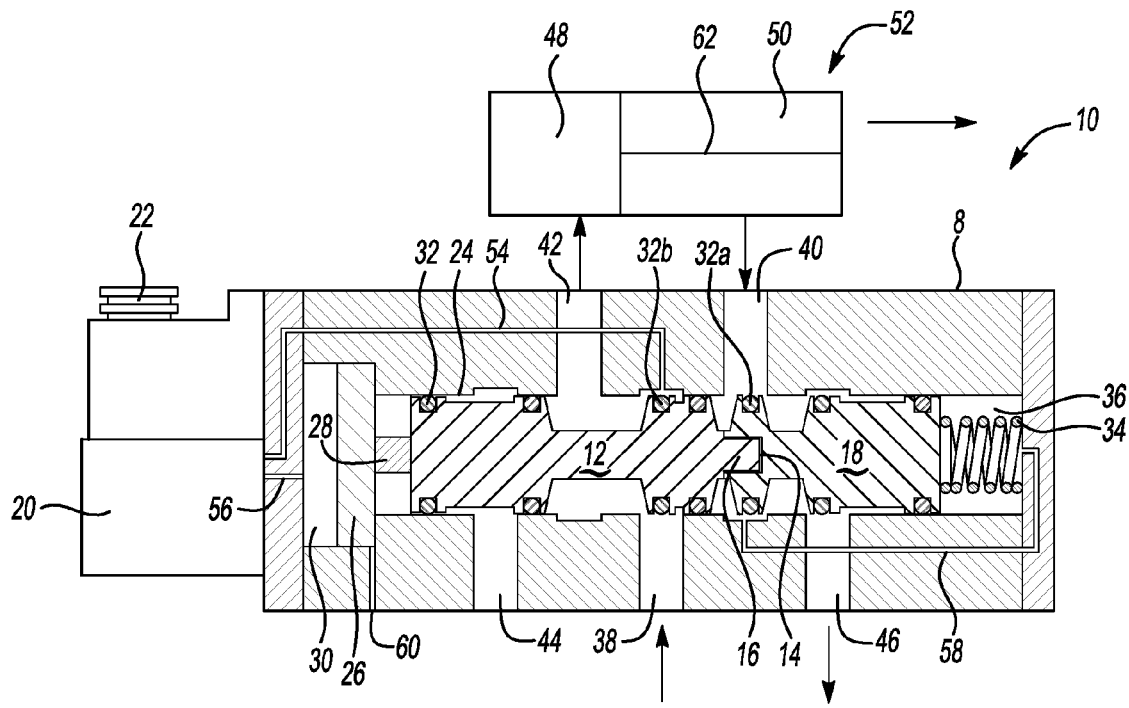
FIG. 2 illustrates the energy saver valve in an actuated position.
Figure 3:
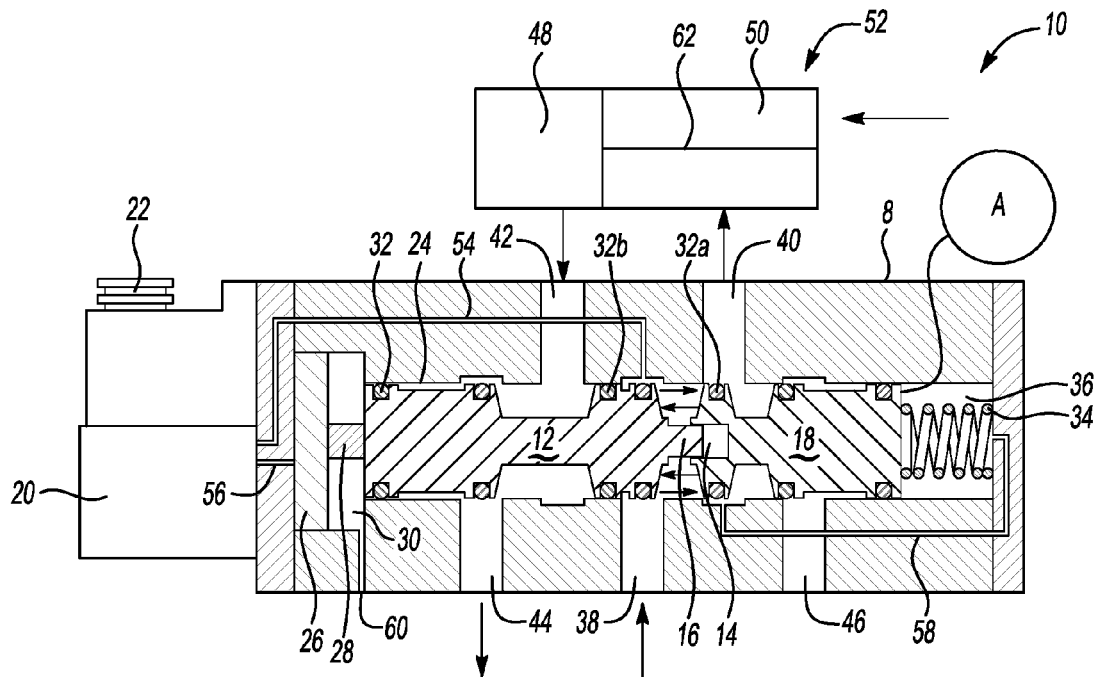
FIG. 3 illustrates the energy saver valve in a de-actuated position.

FIGS. 1 to 3 illustrate an energy saver valve 10. The energy saver valve 10 is a 5/2 way valve used in a system that dispenses a fluid. That is, the energy saver valve 10 includes 5 ports and has two positions. In one example, the energy saver valve 10 is a pneumatic valve that dispenses air. The energy saver valve 10 can be employed in any system that dispenses another fluid. The energy saver valve 10 has an initial position (shown in FIG. 1) and an actuated position (shown in FIG. 2).

The energy saver valve 10 includes a housing 8 that houses a first spool 12 and a second spool 18. In one example, the first spool 12 includes a projection 16 that is received in a hole 14 in the second spool 18. However, the first spool 12 can include a hole 14, and the second spool 18 can include the projection 16. The first spool 12 and the second spool 18 are not connected, but slide relative to each other in a passage 24 of the housing 8 such that the projection 16 moves within the hole 14. In one example, neither of the spools 12 and 18 includes any passages within the structure of the spools 12 and 18.

A plurality of seals 32 located between the spools 12 and 18 and the passage 24 prevent the leakage of fluid. In one example, the seals 32 are o-rings. The energy saver valve 10 includes a solenoid valve 20 including an exhaust 22. The energy saver valve 10 also includes a small piston 26 including a stem 28 that is slidable in a chamber 30. The stem 28 contacts, but is not attached or connected to, the first spool 12. The energy saver valve 10 also includes a resilient member 34, such as a spring, located in a chamber 36 that biases the second spool 18 away from a wall of the chamber 36 and towards the small piston 26. The energy saver valve 10 includes an inlet port 38, a first outlet port 40, a second outlet port 42, a first exhaust port 46, and a second exhaust port 44. As the energy saver valve 10 includes two outlet ports 40 and 42, fluid can be directed to separate chambers 48 and 50 of a piston assembly 52. The piston assembly 52 also includes a piston 62 that separates the chambers 48 and 50.

FIG. 1 illustrates the energy saver valve 10 in an initial non-actuated position, and the solenoid valve 20 is de-energized. The energy saver valve 10 is in the initial position during normal operation. Fluid enters the energy saver valve 10 through the inlet port 38. A passage 54 in fluid communication with the inlet port 38 and the solenoid valve 20 is subject to a high pressure.

The fluid flows through the first outlet port 40 and into the chamber 50 at a low pressure such that the piston 62 in the piston assembly 52 is retracted. A passage 56 in fluid communication with the solenoid valve 20 and the chamber 30 that contains the small piston 26 is not subject to pressure and is in fluid communication with an exhaust 60. In the initial position, the chamber 36 that contains the resilient member 34 and the first outlet port 40 are at a lower pressure and in fluid communication with a passage 58. The passage 58 is in fluid communication with the first outlet port 40, but is not in fluid communication with the solenoid valve 20. When the energy saver valve 10 is in the initial position, the resilient member 34 in the chamber 36 is in an extended position, biasing the second spool 18 towards the first spool 14. A gap is defined between the projection 16 and the hole 14 of the spools 12 and 18. The fluid in the chamber 48 of the piston assembly 52 is exhausted through the second outlet port 42 and then the second exhaust port 44. When the energy saver valve 10 is in the initial position, the first exhaust port 46 is closed.

FIG. 2 illustrates the energy saver valve 10 in an actuated position, and the solenoid valve 20 is energized. When the energy saver valve 10 is in the actuated position, the system including the energy saver valve 10 is operating or working to dispense another fluid. Fluid enters the energy saver valve 10 through the inlet port 38. A passage 54 in fluid communication with the inlet port 38 and the solenoid valve 20 is subject to a high pressure.

A passage 56 in fluid communication with the solenoid valve 20 and the chamber 30 that contains the small piston 26 is subject to pressure, moving the small piston 26 in the chamber 30 towards the first spool 12 until the small piston 26 contacts and engages the first spool 12. The first spool 12 then moves such that the projection 16 extends into the hole 14, moving the second spool 18 until the second spool 18 contacts and compresses the resilient member 34 in the chamber 36.

The fluid flows through the second outlet port 42 and into the chamber 48 of the piston assembly 52 at a high pressure such that a piston 62 in the piston assembly 52 is extended. The pressure of the fluid flowing out of the second outlet port 42 in the actuated position is greater than the pressure of the fluid flowing out of the first outlet port 40 when the energy saver valve 10 is in the initial position.

In the actuated position, the chamber 36 and the passage 58 in fluid communication with the first outlet port 40 and the chamber 36 that contains the resilient member 34 is not subject to pressure and functions as an exhaust. The fluid in the chamber 50 is exhausted through the first outlet port 40 and the first exhaust port 46. When the energy saver valve 10 is in the actuated position, the second exhaust port 44 is closed.

FIG. 3 illustrates the energy saver valve 10 in a de-actuated position after actuation of the energy saver valve 10 is complete, and the solenoid valve 20 is de-energized. The energy saver valve 10 is in the de-actuated position when the energy saver valve 10 moves from the actuated position of FIG. 2 to the initial position of FIG. 1.

As explained above, fluid enters the energy saver valve 10 through the inlet port 38. The passage 54 in fluid communication with the inlet port 38 and the solenoid valve 20 is subject to a high pressure. The fluid flows through the first outlet port 40 and into the chamber 50 at a lower pressure such that the piston 62 in the piston assembly 52 is retracted.

A passage 56 in fluid communication with the solenoid valve 20 and the chamber 30 that contains the small piston 26 is not subject to pressure and is in fluid communication with the exhaust 60. In the initial position, the chamber 36 that contains the resilient member 34 and the first outlet port 40 are at the lower pressure and in fluid communication with a passage 58.

As soon as a seal 32b on the first spool 12 moves away from the inlet port 38 during de-actuation, the pressure from the inlet port 38 further pushes the first spool 12 to the initial position. The second spool 18 and a seal 32a work together as a pressure regulator. That is, a pressure entering the inlet port 38 multiplied by an area of an end of the second spool 18 contacting the resilient member 34 is equal to a pressure exiting the first outlet port 40 multiplied by the area of the end of second spool 18 contacting the resilient member 34 plus the force of the resilient member 34.

Additionally, when the solenoid valve 20 is de-energized, the resilient member 34 in the chamber 36 returns to the extended position, biasing the first spool 12 and the second spool 18 towards the small piston 26, as shown in FIG. 3, causing the small piston 26 to move away from the resilient member 34.

The seal 32a prevents fluid leakage between the inlet port 38 and the first outlet port 40 when the energy saver valve 10 is in the de-actuated position of FIG. 3, allowing the pressure differences between these ports to be maintained. When the energy saver valve 10 is in the de-actuated position, the gap located between the projection 16 and the hole 14 of the spools 12 and 18 is slightly larger than the gap that is defined between the projection 16 and the hole 14 of the spools 12 and 18 in the initial position as the pressure from the inlet port 38 biases the spools 12 and 18 slightly apart. However, the resilient member 34 returns the spools 12 and 18 to the initial position of FIG. 1. The fluid in the chamber 48 is exhausted through the second outlet port 42 and the second exhaust port 44.

Once the energy saver valve 10 returns to the initial position of FIG. 1, the seal 32a completely prevents fluid communication between the inlet port 38 and the first outlet port 40 once the spools 12 and 18 are in the initial position. In one example, the pressure is maintained at 2 bar (29 psi).

Figure 4:
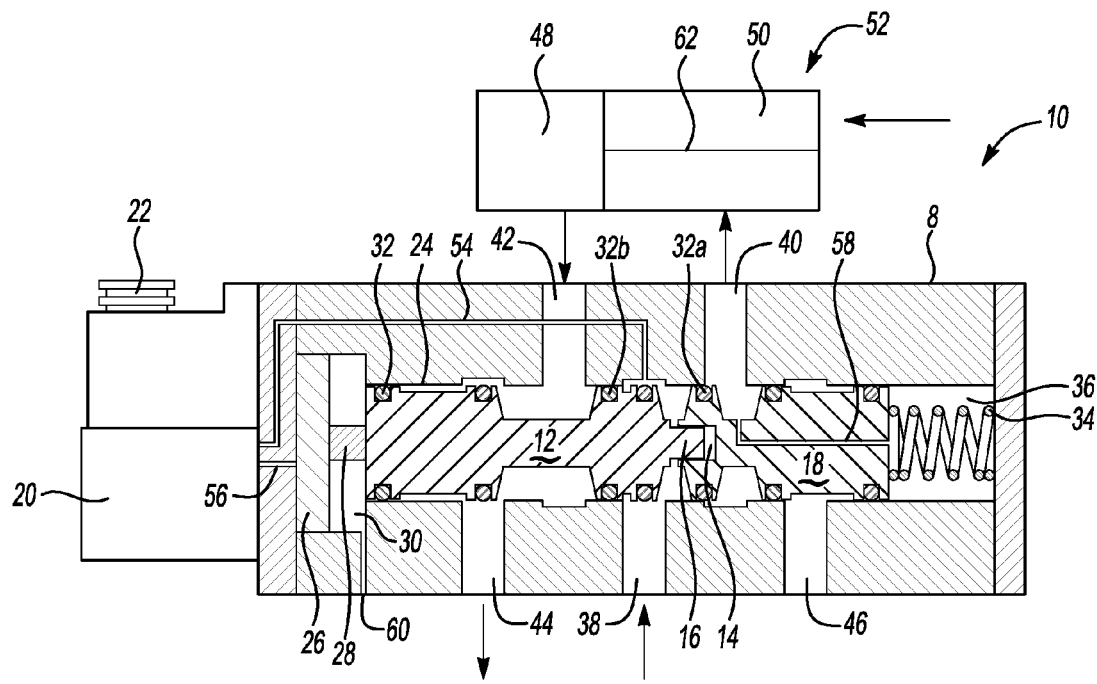
FIG. 4 illustrates another energy saver valve.

FIG. 4 illustrates another energy saver valve 10 in an initial position. In this example, the passage 58 extends through the second spool 18 from the chamber 36 that contains the resilient member 34 to the second outlet port 42.

Figure 5:
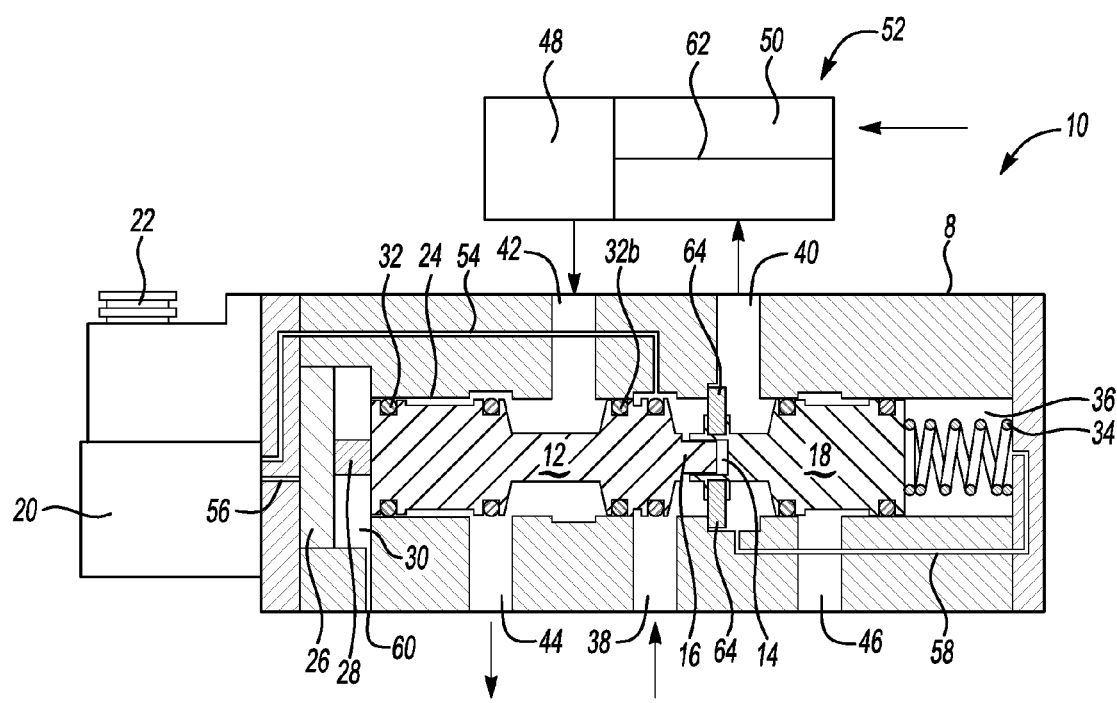
FIG. 5 illustrates another energy saver valve.

FIG. 5 illustrates another energy saver valve 10 in the initial position. In this example, the seal 32a is replaced by a poppet seal 64 to provide additional sealing.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An energy saver valve comprising:
   a first spool slidably received in a passage of a housing, wherein the first spool includes a first engagement feature that is one of a projection and a hole;
   a second spool slidably received in the passage of the housing, wherein the first spool and the second spool are separate components, and the second spool includes a second engagement feature that is the other of the projection and the hole, wherein the projection is receivable in the hole;
   a resilient member located in a resilient member chamber that biases the second spool towards the first spool;
   a first outlet port, wherein fluid flows through the first outlet port at a first pressure when the energy saver valve is operating in an initial mode, wherein an other passage provides fluid communication between the fluid in the resilient member chamber and the first outlet port, wherein the first spool is in a first spool initial position and the second spool is in a second spool initial position when the energy saver valve is operating in the initial mode;

a second outlet port, wherein the fluid flows through the second outlet port at a second pressure when the energy saver valve is operating in an actuated mode, wherein the first spool is in a first spool actuated mode and the second spool is in a second spool actuated position when the energy saver valve is operating in the actuated mode;

a piston slidable in a piston chamber, wherein a portion of the piston contacts a portion of the first spool;

a cylinder having a cylinder piston that defines a separate first compartment and a second compartment, and the first outlet port is in fluid communication with the first compartment, and the second outlet port is in fluid communication with the second compartment.

2. The energy saver valve as recited in claim 1 including a plurality of seals between the first spool and the second spool and the housing.

3. The energy saver valve as recited in claim 1 wherein, when the energy saver valve is operating in the initial mode, the resilient member is in a partially compressed state to bias the second spool towards the first spool, the fluid enters an inlet port and flows through the first outlet port to retract a cylinder piston, and the fluid flows through the second outlet port and a second exhaust port.

4. The energy saver valve as recited in claim 1 wherein, when the energy saver valve is operating in the actuated mode, a solenoid valve is energized to bias the first spool and the second spool towards the resilient member to compress the resilient member to a compressed state, the fluid enters an inlet port and flows through the second outlet port to extend a cylinder piston, and the fluid flows through the first outlet port and a first exhaust port.

5. The energy saver valve as recited in claim 1 wherein the other passage is within the second spool.

6. The energy saver valve as recited in claim 1 including a plurality of seals located outside the first spool and the second spool that are proximate to a location wherein the projection is receivable in the hole.

7. The energy saver valve as recited in claim 1 wherein the resilient member is located between the second spool and the housing.

8. An energy saver valve comprising:
a first spool slidably received in a passage of a housing;
a second spool slidably received in the passage of the housing, wherein the first spool and the second spool are separate components;
a resilient member located in a resilient member chamber that biases the second spool towards the first spool;
a first outlet port, wherein fluid flows through the first outlet port at a first pressure when the energy saver valve is operating in an initial mode, wherein an other passage provides fluid communication between the fluid in the resilient member chamber and the first outlet port, wherein the first spool and the second spool are in an initial position when the energy saver valve is operating in the initial mode;
a second outlet port, wherein the fluid flows through the second outlet port at a second pressure when the energy saver valve is operating in an actuated mode, wherein the first spool is in a first spool actuated position and the second spool is in a second spool actuated position when the energy saver valve is operating in the actuated mode;
a piston slidable in a piston chamber, wherein a portion of the piston contacts a portion of the first spool; and
a seal that surrounds the first spool, wherein as the seal moves away from an inlet port, pressure from the inlet port during de-actuation pushes the first spool towards the first spool initial position.

9. An energy saver valve comprising:
a first spool slidably received in a passage of a housing, wherein the first spool includes a first engagement feature that is one of a projection and a hole;
a second spool slidably received in the passage of the housing, wherein the first spool and the second spool are separate components, and the second spool includes a second engagement feature that is the other of the projection and the hole, wherein the projection is receivable in the hole;
a resilient member located in a resilient member chamber that biases the second spool towards the first spool; and
a first outlet port, wherein fluid flows through the first outlet port at a first pressure when the energy saver valve is operating in an initial mode, wherein an other passage provides fluid communication between the fluid in the resilient member chamber and the first outlet port;
a second outlet port, wherein the fluid flows through the second outlet port at a second pressure when the energy saver valve is operating in an actuated mode; and
a cylinder including a cylinder piston that defines a separate first compartment and a second compartment, wherein the first outlet port is in fluid communication with the first compartment, and the second outlet port is in fluid communication with the second compartment,
wherein, when the energy saver valve is in the initial mode, the resilient member is in a partially compressed state to bias the second spool towards the first spool, a solenoid valve is non energized, the fluid enters an inlet port and flows through the first outlet port to retract the cylinder piston, and the fluid flows through the second outlet port and a second exhaust port, wherein the first spool is in a first spool initial position and the second spool is in a second spool initial position when the energy saver valve is operating in the initial mode, and
wherein, when the energy saver valve is in the actuated mode, the solenoid valve is energized to bias the first spool and the second spool towards the resilient member to compress the resilient member to a compressed state, fluid enters the inlet port and flows through a second outlet port to extend a cylinder piston, and the fluid flows through the first outlet port and a first exhaust port, wherein the first spool and the second spool are in an actuated mode when the energy saver valve is operating in the actuated mode.

10. The energy saver valve as recited in claim 9 including a plurality of seals between the first spool and the second spool and the housing.

11. The energy saver valve as recited in claim 10 wherein the other passage is within the second spool.

12. The energy saver valve as recited in claim 9 wherein the other passage provides fluid communication between the resilient member chamber and the solenoid valve.

13. The energy saver valve as recited in claim 9 wherein, as a seal that surrounds the first spool moves away from the inlet port, pressure from the inlet port during de-actuation pushes the first spool towards the first spool initial position.

14. The energy saver valve as recited in claim 13 wherein the seal is a poppet seal.

* * * * *